Figure 1A:
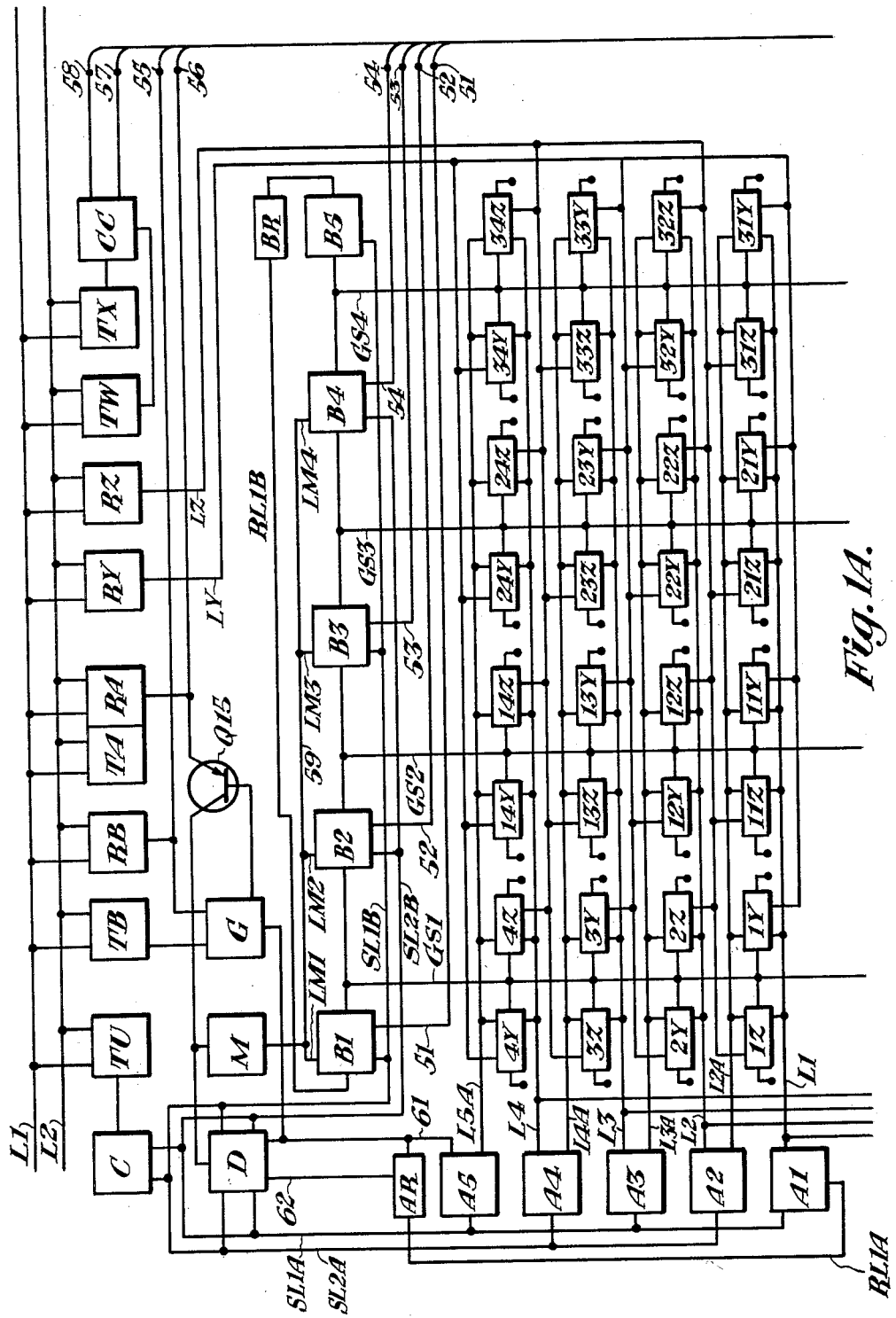

INVENTOR.
Edgar Ian White
BY
W. L. Stout
HIS ATTORNEY

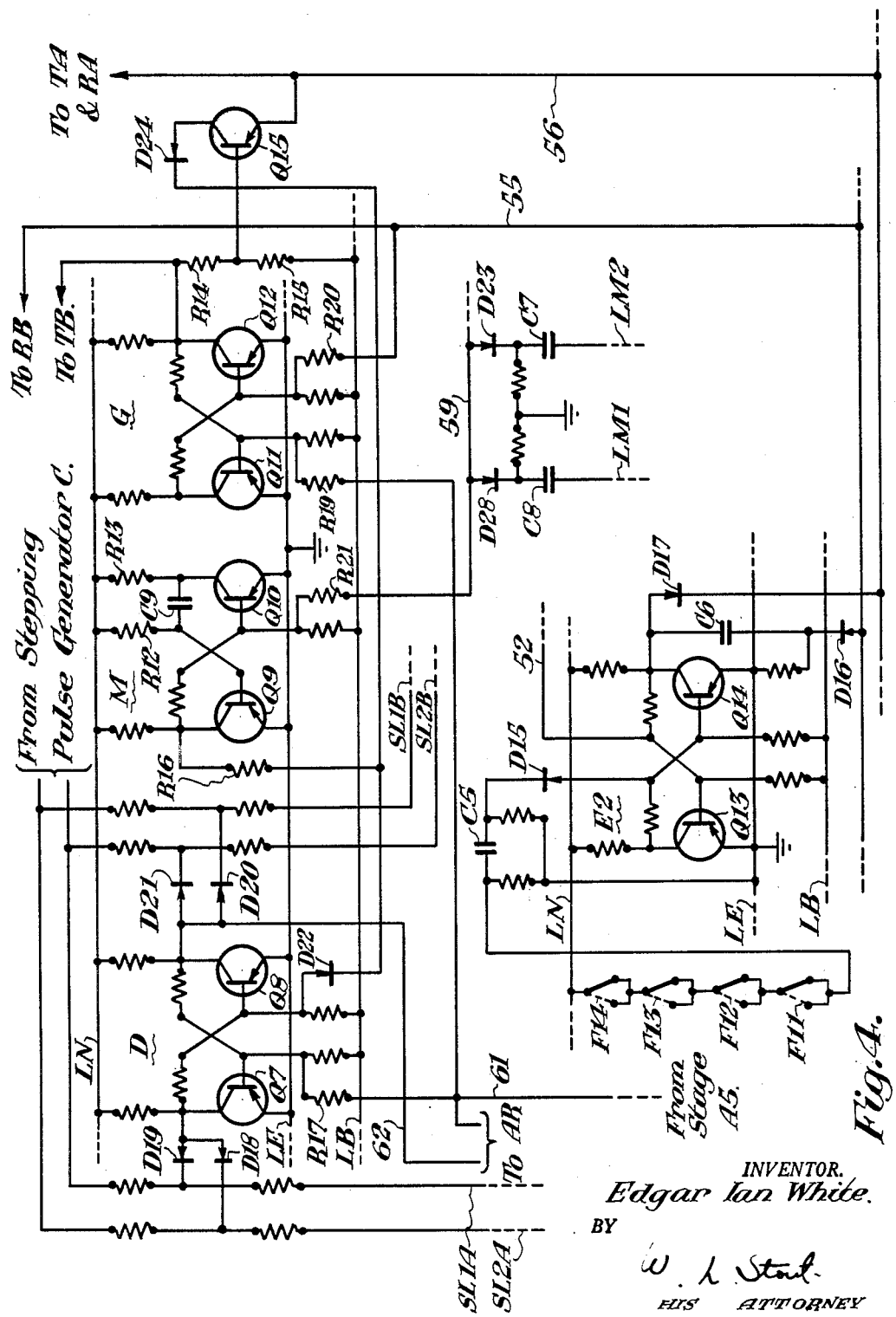

United States Patent Office 3,133,267
Patented May 12, 1964

3,133,267
REMOTE CONTROL SYSTEMS HAVING SCANNING CYCLE BYPASS MEANS
Edgar Ian White, London, England, assignor to Westinghouse Brake and Signal Company Limited, London, England
Filed Feb. 8, 1961, Ser. No. 87,843
Claims priority, application Great Britain Feb. 12, 1960
10 Claims. (Cl. 340—147)

My invention relates to remote control systems. More particularly, my invention relates to a remote control system of the continuously scanning type in which a portion of the scanning cycle may be bypassed to more quickly transmit a change in any of the control and indication functions handled by the system.

Continuously scanning remote control systems based on electronic components, for example, transistors, have high stepping speeds. The total cycle time may be, for example, on the order of one second. A cycle of this duration will result, under the worst circumstances, in a delay of nearly one second before the transmission of a revised control or information function in response to the change in the setting of a control or indication element. This is followed by a further delay of one second, in a case of a control function, before the corresponding revised indication information is returned during the next cycle of operation. In many installations of such systems, this cycle time is generally of no consequence since the information returned to the control office is still acceptably fresh. In other words, control and indication functions are transmitted to the other location so quickly after the change that the delay is of no consequence relative to the general operating time of the apparatus.

The example previously discussed takes no account of the time which may be needed to perform checks on the received information at any location. For example, the system may require that a check be made so that the information received at a station is not made effective until it has been confirmed by the reception of the identical information from the source during the next operating or scanning cycle. Consequently, the total possible delay time is doubled. Furthermore, the greater the number of functions which are to be scanned in an installation, the higher the rate of stepping or scanning that is necessary to keep the total possible delay time within acceptable limits. Of course, increases in the rate of scanning are apt to introduce complications which decrease the reliability of the system. The total time of scanning in the reception of information and the reliability of the system are of particular importance where large scale railroad interlockings, for example, are controlled by such a system. Here the speed of operation of a control system is of extra importance. In a large scale installation, a single system may serve if the time delay before the transmission and reception of revised control and indication functions can be kept to a short enough interval. This characteristic can be provided, within reliable scanning speeds, if a portion of the scanning cycle which includes a new change in a function, either control or indication, may be given priority of transmission over the remaining portion of the cycle which, at that instant, does not contain any changes for transmission. In other words, such a system provides for the bypassing of intervening portions of the scanning cycle, which do not include any function changes, in order to reach a portion of the scanning cycle during which a control or information function change is to be transmitted. Once this new information is transmitted, the system can then resume its normal, continuous scanning operation. Thus, the change in a function establishes a priority call which decreases the scanning interval intervening prior to its transmission.

Accordingly, an object of my invention is a continuously scanning remote control system having shorter function transmission times.

Another object of my invention is a continuously scanning remote system incorporating an arrangement for establishing a priority call so that function changes may be rapidly transmitted without regard for the total scanning cycle.

A further object of my invention is to provide a priority arrangement in a continuously scanning remote control system by which intervening portions of the scanning cycle may be bypassed in order to quickly transmit changes which occur in the assigned functions.

Still another object of my invention is a priority arrangement for continuously scanning remote control systems which detects changes in any function at any location and actuates a bypassing of the intervening portions of the scanning cycle in order to shorten the time interval prior to transmission of the function changes.

It is also the object of my invention to provide a means in a continuously scanning remote control system that causes the scaning operation to advance by function groups to quickly reach a group of functions containing a change so that transmission of that function change may be accomplished without undue delay.

Other objects, features, and advantages of my invention will become apparent from the following specification and appended claims when taken in connection with the accompanying drawings.

Figure 1B:
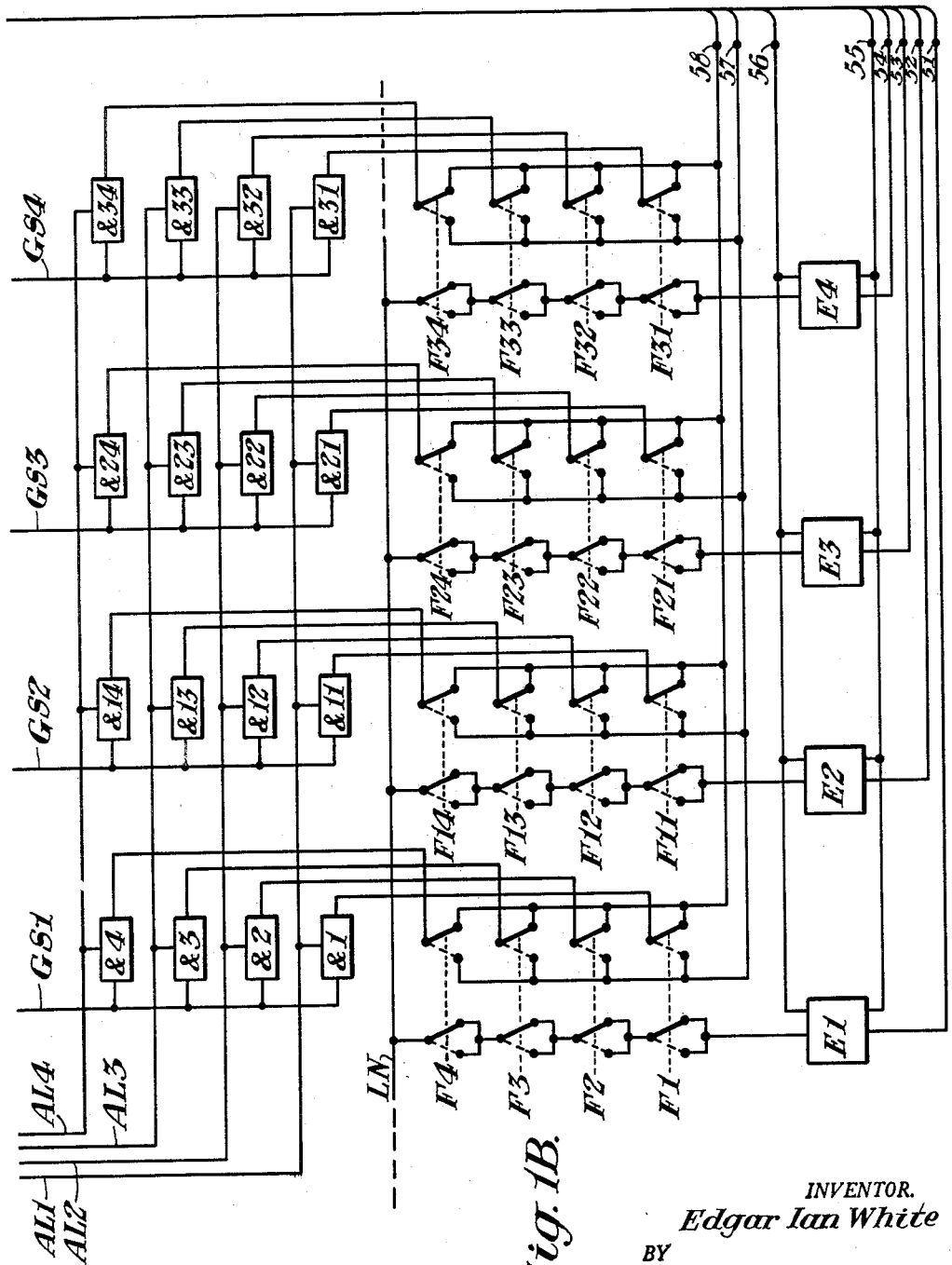

Referring to the drawings,

FIGS. 1A and 1B, taken together with FIG. 1A at the top and corresponding connecting lines matched, show by conventional block diagram the control office in one form of a multi-station, continuously scanning remote control system embodying my invention.

Figure 2A:
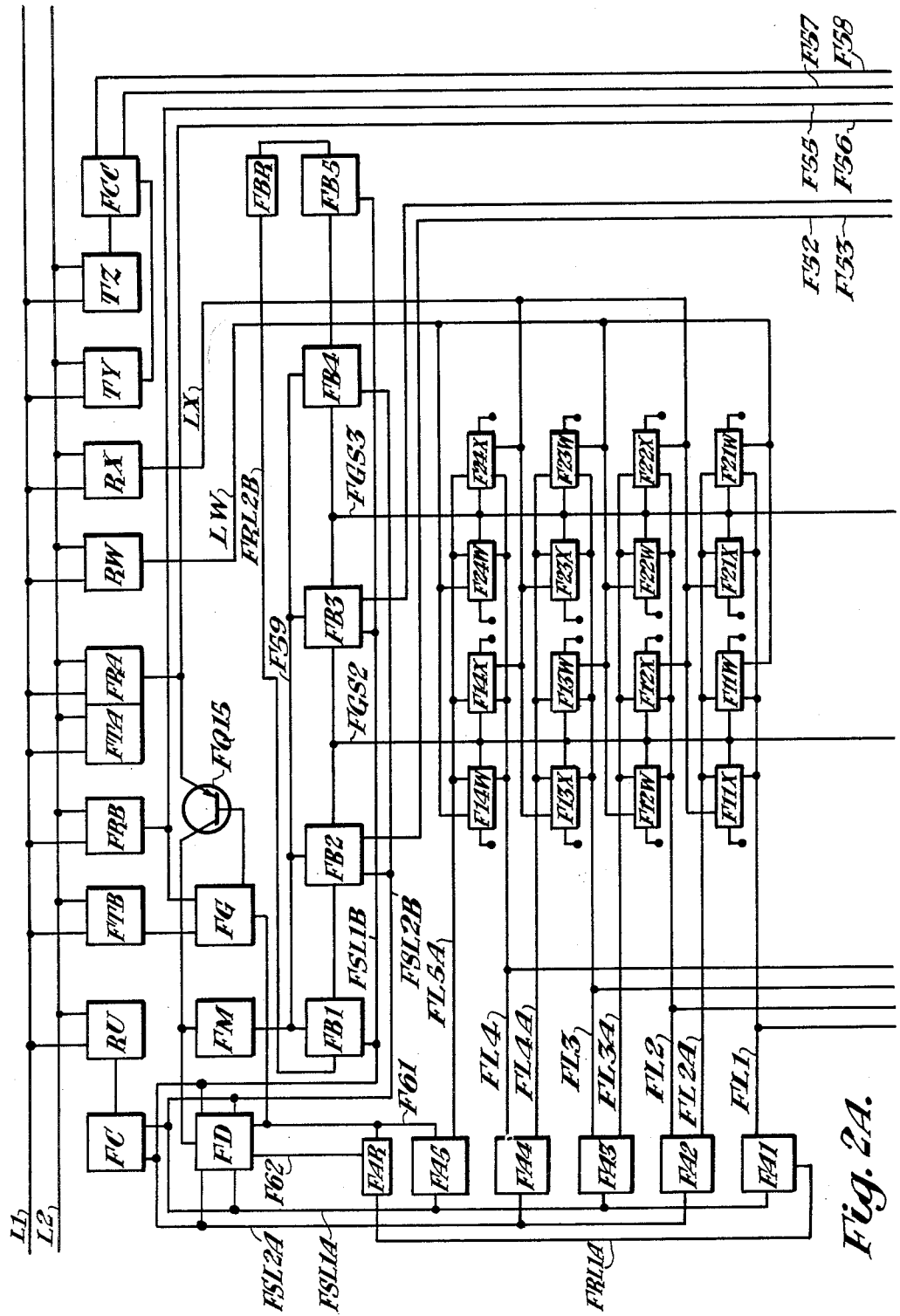
Figure 2B:
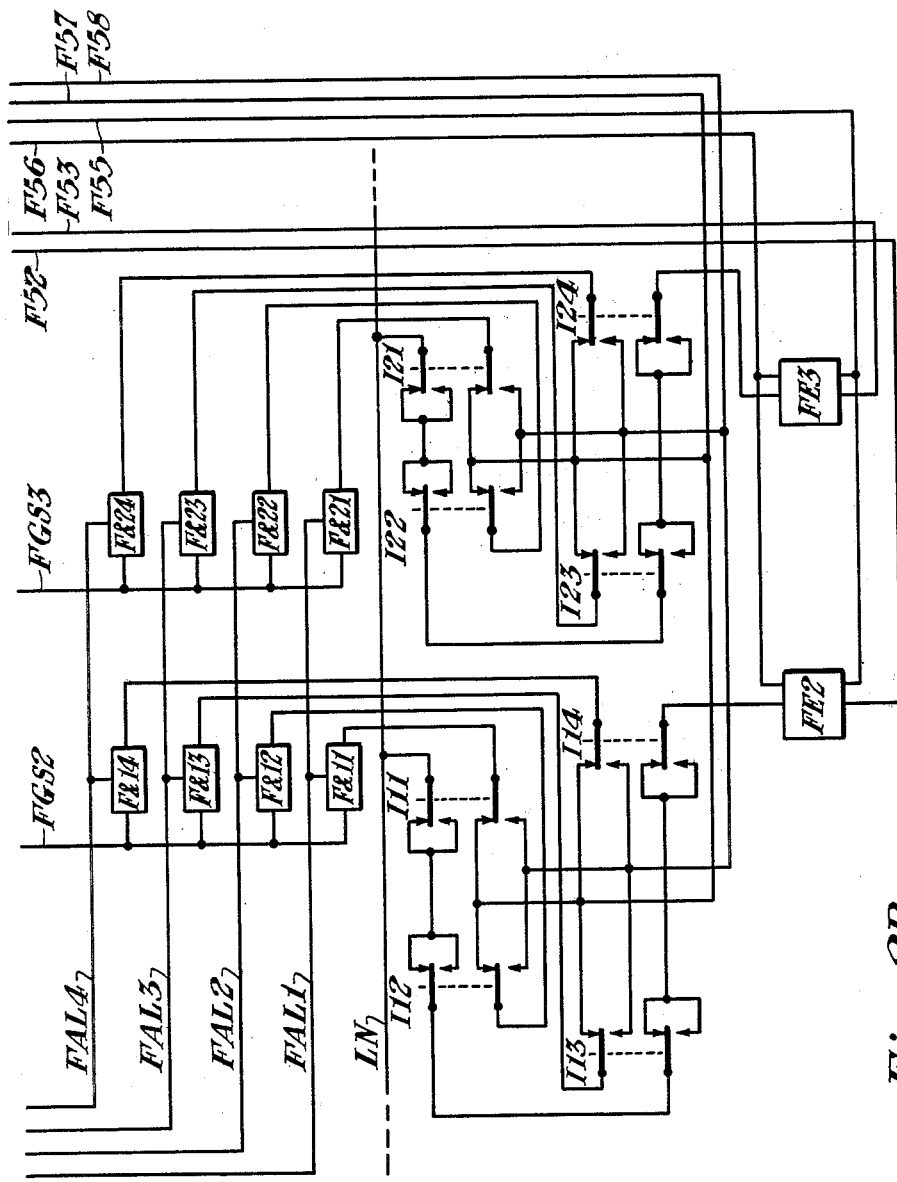

FIGS. 2A and 2B, taken together with FIG. 2A above FIG. 2B and corresponding lines matched, show by conventional block diagram one station location of the system which cooperates with the office location of FIGS. 1A and 1B.

Figure 3:
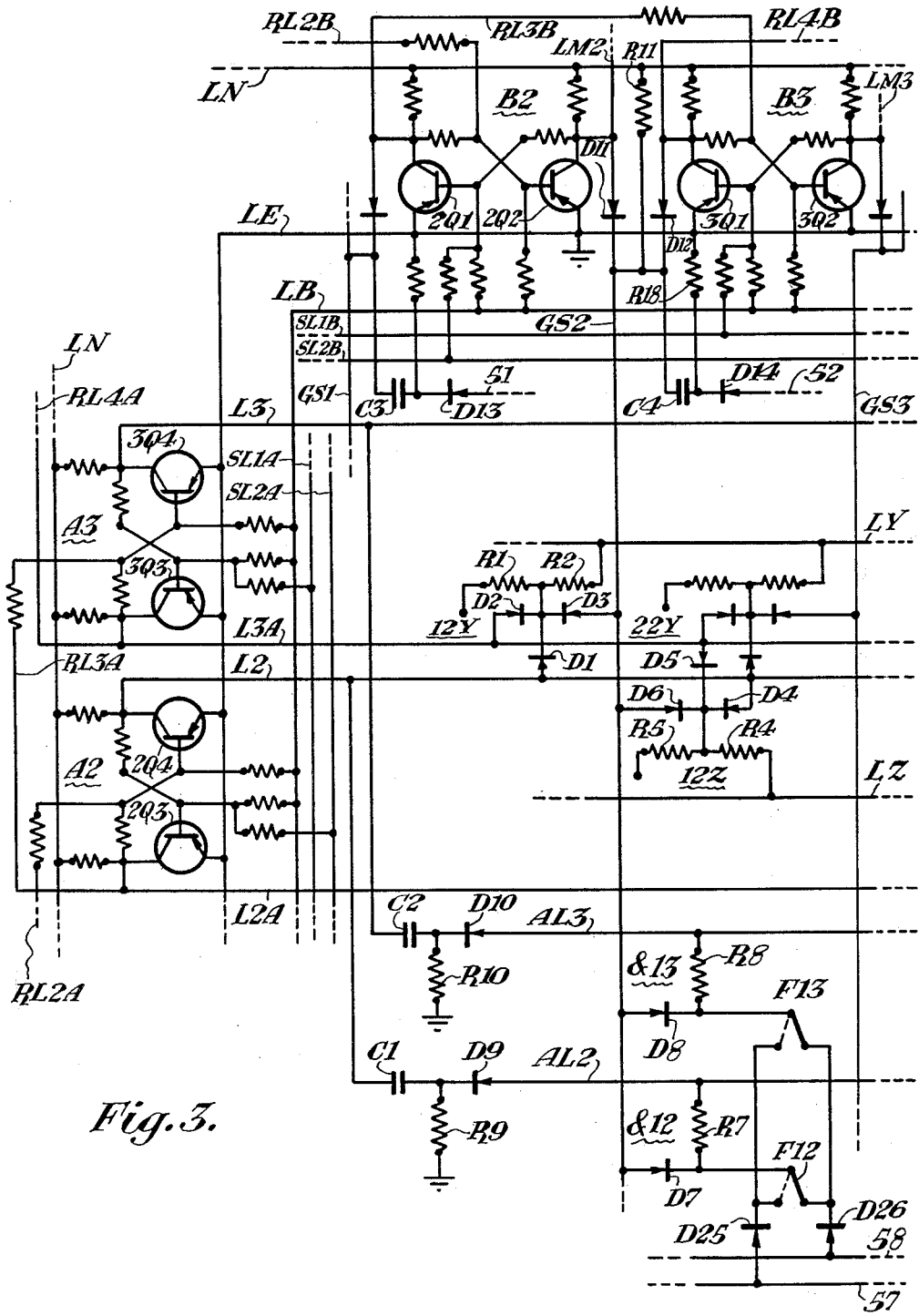

Diagrammatically illustrated in FIG. 3 are the detailed circuits of one form of my invention for selected portions of the office apparatus of FIGS. 1A and 1B.

FIG. 4 shows diagrammatically the detailed circuits for other selected portions of the office apparatus shown in FIGS. 1A and 1B embodying one form of my invention.

In each of the drawings, similar reference characters denote similar parts of the apparatus.

In practicing my invention, each location in the continuously scanning remote system has groups of functions or elements which are normally consecutively scanned at all stations. In other words, the scanning cycle moves successively from group to group with the functions within each group being successively scanned in the stepping interval between successive groups. The system thus idles, step by step, throughout the entire scanning cycle. However, a change in the position or condition of any element at the office or station registers a priority call for the corresponding function group. This actuates the scanning control means to advance the scanning cycle directly from group to group, eliminating the internal group scanning of the intervening groups preceding the priority call. Equivalent group scanning operation, of course, occurs at all stations in the system. The successive group scanning halts when the particular group is reached at which the priority call is registered. The elements of that group are then scanned successively in the usual manner to transmit the changed or new function.

The action thus advances rapidly to handle changes in the functions assigned to the system, the intervening elements being bypassed or unscanned for that particular cycle. The time delay interval prior to the transmission of a function change is thus reduced to a minimum time length since the priority arrangement effects the handling more quickly than the normal scanning sequence.

In the specific form illustrated, each location of the system has a pair of counting chains, a scanning control counting chain for scanning the functions within the groups and a group selector counting chain for sequential selection of the function groups in predetermined order. Together, these chains at each location define a transmission matrix of function scanning points. The corresponding chains at all locations of the system operate in synchronism. In connection with the reception of the functions at receiving locations, the same pair of counting chains define a registry matrix having the same number of points as the transmission matrix at that location. During normal operation, the group selector chain advances only one step. This is followed by a complete scanning operation through the scanning chain, which steps its entire length and then resets to normal. This actuates a following single step advance by the group chain which again is followed by a scanning cycle through the scanning chain. This sequence of operations continues throughout the entire length of the group chain which then resets and the complete scanning cycle is reinitiated for another operation. This operation thus defines step by step the various points in the transmission and registry matrices. These points are specifically located by output leads connected from selected points in each of the chains to define a cross bar type layout. Variously designed AND circuits are connected at the intersections of these matrix leads from the two chains, one type of circuit for the registry matrix and another type for the transmission matrix. Obviously a different AND circuit of each type is actuated in sequence for each possible pair of the counting chain stages. The actuated AND circuits control the transmission and registry of the assigned functions in their normal sequence.

At each location, a change in any function registers a priority call in a circuit element associated with the particular function group in which the change has occurred. This actuates certain other selected circuit elements to cause, as soon as the existing scanning chain action is completed, successive stepping only by the group selector chains until the group scanning action reaches the group of functions in which the change has occurred. In this group stepping action, the intervening scanning periods of the scanning chain are completely eliminated. When the selected group is reached, the group chain scanning is halted and the normal stepping action through the scanning chain occurs during which the changed function is transmitted. Transmission of this function change cancels the priority and normal scanning action continues from that point throughout the remaining portion of the cycle if no other priority call has been registered.

I shall now describe the operation, in greater detail, of the form of my invention shown in the accompanying drawings and shall then point out the novelty thereof in the appended claims.

The apparatus at each of the system locations shown in the drawings is provided with a local source of direct current energy of proper size and capacity. Any conventional source may be used for this purpose and, since the use of such sources is well known, only the bus connections to the positive and the negative terminals and to an intermediate point of the source are shown, designated by the reference characters LB, LN, and LE respectively. The bus connection LE is also the system ground at each location, as is illustrated by specific connection to the conventional grounding symbol. The system is shown in a completely transistorized form, each of the transistors being illustrated as of the P-N-P junction type. Obviously, N-P-N junction type transistors may also be used if proper modifications are made in the connections to the potential buses. Such modifications are well known to those skilled in the art and it is understood that such changes are included in my invention. Other symbols used through the drawings are conventional in the art and easily understood, or are explained when initially discussed in the following paragraphs.

At the left side of FIG. 1A, in vertical alignment, the five conventional blocks referenced A1 to A5 illustrate five stages of the office scanning control chain. Associated with this chain is a reset circuit illustrated by the conventional block designated AR. The corresponding office group selector chain of five stages is illustrated by the conventional blocks designated B1 to B5, shown in horizontal row to the right and above the scanning chain. The reset circuit associated with the group chain is illustrated by the conventional block BR. Similar chains are illustrated in FIG. 2A by the conventional blocks designated FA1 to FA5, for the station scanning control chain, and FB1 to FB5, for the station group selector chain. It may be noted now that, where similar apparatus is shown and discussed at the office and at the station, the prefix F is used in connection with the reference character for the station or field apparatus to more easily distinguish between similar items of apparatus. Also, at various times, the scanning control and group selector chains may be referred to as the A and the B chains, respectively. It is to be understood that the counting chains are not limited to the five stages shown in the conventional illustrations but that any selected number of stages may be used in each chain. Also, the systems embodying my invention are not limited to an equal number of stages in each of the chains. The arrangement used depends upon the requirements of the particular installation, such as the number of associated functions to be grouped together and the rapidity with which it is desired to scan and thus transmit a change in any function.

Each counting chain stage comprises a transistorized bi-stable circuit arrangement using Eccles-Jordan type connections, these being well known in the art. Each of the stages of the group or B chain includes two transistors, designated by the general reference characters Q1 and Q2, with different numerical prefixes in accordance with the stage number. For example, in FIG. 3, stage B2 of the group selector chain includes transistors 2Q1 and 2Q2. Referring specifically to stage B2, the collector of each transistor is connected through a limiting resistor to negative potential bus LN. The emitters are directly connected to ground potential bus LE while a base bias connection is provided through a biasing resistor to positive potential bus LB. As in the usual Eccles-Jordan arrangement, cross connections are provided through resistors from the collector of each transistor to the base of the other transistor of the bi-stable circuit. The use of resistors in these cross connections is conventional where no delay is desired in the operation of the circuits. As shown, the conventional connections for the circuit provide bi-stable operation in the manner which is well known in the art and need not be explained in great detail. Stepping pulses for the operation of the group selector chain are provided over stepping lines SL1B and SL2B which are alternately connected to the base of transistor Q1 of each of the counting chain stages. The odd numbered stages are connected to line SL1B, the even numbered stages such as B2 being connected to stepping line SL2B. The normal condition of each counting chain stage is with transistor Q2 in its conducting state and the reverse condition of each stage is with transistor Q1 in its conducting stage. It is well known that, when one transistor of the bi-stable circuit is conducting, the other will be in its non-conducting state. An interstage connection, such as RL3B, is provided from the collector of transistor Q1 of each stage to the base of transistor Q2 of the following stage. This connection is primarily for purposes of reset action, as is well known and will be described shortly.

Various connections are taken from selected points in each bi-stable circuit to establish, as is illustrated in FIGS. 1A and 1B, the vertical leads in the cross bar type matrix organization of the system. For example, a group selection lead GS2 is connected through diode D11 to the collector of transistor 2Q2, diode D11 being positioned to pass only a relative positive potential, i.e., ground potential. A branch path is connected through diode D12, positioned similar to diode D11, to the collector of transistor 3Q1 of the subsequent stage of this chain. Diodes D11 and D12, and other diodes shown throughout the various drawings, are illustrated as being half wave rectifiers, the use of such being well known. It is obvious that, with stage B2 in its normal condition, the ground potential appearing at the collector of transistor 2Q2, which is in its conducting state, is passed through diode D11 to group selection line GS2. Since transistor 3Q1 is at this time in its non-conducting state, the negative potential of bus LN, which appears at the collector of transistor 3Q1, is blocked by diode D12. When stage B2 reverses condition, transistor 2Q2 becomes non-conducting with its collector substantially at the full negative potential of bus LN, which is blocked by diode D11. The ground potential is thus removed from line GS2, which then assumes a more negative potential because of the connection from the common terminal of diodes D11 and D12 through resistor R11 to bus LN. This condition of line GS2 continues until stage B3 reverses its condition so that transistor 3Q1 becomes conducting, shifting its collector to the ground potential of bus LE. This potential is passed through diode D12 to line GS2.

Another connection to the collector of transistor 2Q2, designated by the reference character LM2, likewise shifts from the potential of ground bus LE when stage B2 is in its normal condition to the negative potential of bus LN when stage B2 is in its reverse condition. The utilization of the potential on line LM2 and similar lines connected to other stages will be described hereinafter. Connected at the common junction terminal of diodes D11 and D12 is a pulse generating network comprising capacitor C4 and diode D14. When transistor 2Q2 becomes non-conducting, a negative potential pulse is developed in capacitor C4, because of the connection through resistor R11 to bus LN. This pulse passes through diode D14 into line 52 and thence as may be seen from FIGS. 1A and 1B, into the priority detection circuit E2, to be discussed later. Relative positive potential pulses generated by capacitor C4 when either transistor 2Q2 or 2Q3 become conducting, are blocked by diode D14 and are shunted to bus LE through resistor R18. Similar shunt paths are provided for each pulse generating network described hereinafter, but are not always specifically discussed. Referring to both FIG. 3 and to FIG. 1A, it is to be understood that potentials and operating pulses similar to those described for lines GS2, LM2, and 52 will appear in the corresponding lines GS1, GS3, GS4, LM1, LM3, LM4, 51, 53, and 54. These various conditions will exist or be produced as the scanning action steps through the selector chain B. Likewise, since FIG. 3 also represents the station, similar conditions exist at similar times on the equivalent leads in FIG. 2A.

The structure and operation of the scanning control counting chain A is similar to that of the group selector chain. Study of the two stages A2 and A3 shown in detail in FIG. 3 will indicate that the Eccles-Jordan arrangement is again used with similar type connections to the various potential buses and between the transistors. Stepping pulses are supplied alternately over stepping lines SL1A and SL2A to the odd and even numbered counting stages, respectively. Reset connections, illustrated by line RL3A, are connected between the stages in the same manner as the corresponding connections in chain B. The normal condition of each of the stages of chain A is with transistor Q4 in its conducting state. The reverse condition is that in which transistor Q3 is in its conducting state. Necessarily, the opposite transistor is always in its non-conducting state as required by the Eccles-Jordan arrangement. Thus, when a stage is in its normal condition, the collector of transistor Q4 of that stage is at the ground potential of bus LE while the collector of opposite transistor Q3 is at substantially the negative potential of bus LN. When the stage is in its reverse condition, potentials are reversed, the collector of transistor Q3 having the ground potential and the collector of transistor Q4 having the negative potential.

Various connections are made to the collectors of the transistors of the stages of chain A to form the horizontal leads in the matrices shown in FIGS. 1A and 1B. When the stages of chain A are in their normal condition, lines of the registry matrix such as L2 and L3 carry the ground potential of bus LE, while the lines L2A and L3A carry approximately the full negative potential of bus LN. The source of these potentials is obvious considering the conducting state of the transistors of each stage. However, when stage A2 reverses its condition the potential applied to line L2 changes to approximately the negative potential of bus LN, while the potential on line L2A becomes the ground potential of bus LE, due to the opposite conducting state of the transistors of that stage. Each line L connected to the collector of a transistor Q4 has a branch path through a pulse generating network to a corresponding auxiliary line AL in the transmitting matrix of the system. For example, from line L2, connection is made through capacitor C1 and diode D9 to line AL2. A similar branch from line L3 extends through capacitor C2 and diode D10 to auxiliary line AL3. Thus, when transistor 2Q4 becomes non-conducting and the potential of line L2 changes, a negative potential pulse is developed in capacitor C1 which is applied through diode 9 to line AL2. A similar pulse is provided to line AL3 when line L3 changes to the negative potential upon the reversal of stage A3.

The registry and transmission matrices are made up of AND circuits, a different type being used in each matrix to meet the circuit requirements. Each AND circuit in each matrix is controlled by a stage in each of the counting chains in this cross bar type operation provided. AND circuits respond to the input or lack of input from the several connections to actuate the function registry and transmission. In the conventional illustration of the office in FIGS. 1A and 1B or the station location in FIGS. 2A and 2B, the registry AND circuits are shown by conventional blocks designated by a letter reference corresponding to the carrier receiver over which the function is received for registry. Each registry AND circuit reference has a numerical prefix which, in its unit digit, corresponds to the numerical reference of the actuating counting stage in the A chain. The tens digit of this numerical prefix is one less than the numerical reference of the actuating B chain stage. Thus, in the first group of registry circuits in the matrix of FIG. 1A, which are actuated by stage B1 and successively by the various stages of the A chain, the registry AND circuits designated 1Y, 2Y, 3Y and 4Y are those controlled by receiver RY shown at the top of FIG. 1A, while the other circuits, designated by reference characters 1Z, 2Z, 3Z and 4Z, are those controlled by the receiver RZ. Each AND circuit in this registry matrix has an output lead which terminates in a conventional terminal symbol to denote a connection to the actual registry stage for the corresponding function. Such registry stages will be discussed shortly in connection with the more detailed showing of the AND circuits in FIG. 3.

The transmitting matrix shown in FIG. 1B, or in FIG. 2B shows the AND circuits by conventional block diagram designated by the conventional symbol & with a numerical suffix similar to the prefix used for the corresponding registry matrix circuits. The output lead from each transmission AND circuit, in the office location of FIG. 1B, is carried to the movable armature of a manually operable switch or lever. Each switch is shown as a two-position lever which feeds the output from the corresponding AND circuit to the carrier control selector circuit CC over lines 57 and 58. A similar arrangement using relay contacts is provided at each field station location (FIG. 2B). These circuit connections to the carrier selector will be discussed shortly.

Referring now to FIG. 3, the detailed circuits for the registry AND circuits 12Y and 12Z are shown in the right center of the drawings. These circuits are designated by the reference characters appearing near the terminal leading to the actual registry circuit. Circuit 12Y comprises resistors R1 and R2 and diodes D1, D2, and D3 while circuit 12Z comprises resistors R4 and R5 and diodes D4, D5, and D6. When normal conditions exist in counting stages A2, A3, and B2, ground potential exists on lines GS2 and L2 while negative potential exists on line L3A, all this previously discussed. Thus, by the connections through diodes D1 and D3, ground potential exists at the intermediate junction of the series resistor circuit R1, R2. Diode D2 blocks the negative potential presently appearing on line L3A from affecting the potential at this point. With this condition existing within the AND circuit 12Y, a negative signal appearing on line LY from receiver RY is ineffective, being blocked or cancelled by the ground potential existing at the intermediate junction of the two resistors. Only when negative potential exists on lines L2, L3A, and GS2 simultaneously, and is blocked by diodes D1, D2, and D3, respectively, can a negative signal on line LY be passed through resistors R1 and R2 to the output terminal 12Y. This condition is obtained when counting stages B2 and A2 have reversed their condition and stage A3 is yet in its normal condition. This occurs obviously when the B2 group in the matrix has been selected by the reversal of stage B2 and the count in the A chain has reached stage A2 but has not advanced into stage A3.

When the count in the A chain advances into stage A3, that is, stage A3 reverses its condition, the potential on line L3A shifts to the ground potential of bus LE. This ground potential passes from line L3A through diode D2 to the junction terminal between resistors R1 and R2 and blocks the passage of any negative signal on line LY through the resistor circuit. It may be noted that, when the next function group is selected by chain B, that is, stage B3 reverses its condition, the potential on line GS2 shifts to the ground potential of bus LE, due to the conducting state of transistor 3Q1 at this time, and circuit 12Y is blocked. Referring to AND circuit 12Z, it is obvious that similar conditions exist as a result of the various counting actions. Ground potential on line L2, L3A, or GS2 blocks the passage of a negative signal from line LZ through the resistor circuit R4, R5, the ground potential appearing through diodes D4, D5, and D6, respectively, at the intermediate junction terminal between these resistors to accomplish the blocking action. It is obvious that the operation of registry AND circuit 22Y, also shown in detail, is similar, the control being exercised by lines L2, L3A, and GS3, circuit 22Y being part of the group selected by counting stage B3 of the group selector chain.

The negative signal from line LY or LZ, when passed through resistors R1, R2 or R4, R5, respectively, to terminal 12Y or 12Z, is then applied to a registry circuit. This latter circuit must be capable of distinguishing the source of the signal, i.e., terminal 12Y or 12Z, and must retain an indication of this character until again changed. Such circuits are well known in this art and have not herein been shown, not being a part of my invention. A specific type which may be used is shown in the copending application for Letters Patent of the United States Serial No. 710,718, filed January 23, 1958, by B. H. Grose and S. L. Hurst, for Remote Control Systems, now Patent No. 3,035,248, issued May 15, 1962, this prior patent and the present case having the same assignee. Particular reference is made to FIG. 7 of this patent for an illustration of a registry circuit.

The transmitter circuit &12 shown in the lower right of FIG. 3 is connected to group selector line GS2 through diode D7 and to auxiliary line AL2 through resistor R7. With line GS2 at ground potential when stage B2 is in its normal condition, the ground potential is passed by diode D7 to the junction point of diode D7 and resistor R7. This junction terminal thus remains at ground potential even when a negative potential pulse appears on line AL2 as a result of a reversal of condition of stage A2. This ground potential is, of course, blocked from transmission into lines 57 and 58 by diodes D25 and D26 regardless of the position of function selector switch F12. When stage B2 reverses its condition during the counting action, diode D7 blocks the negative potential then appearing on line GS2 and the junction terminal of resistor R7 and diode D7 is without any potential until a pulse appears in line AL2. The pulse, of course, is generated by the pulse generating unit comprising capacitor C1 and diode D9 when counting stage A2 reverses its condition to place negative potential on line L2. This negative potential pulse feeds through resistor R7 to the movable portion of switch F12 and, in accordance with the position of this switch, is routed into line 57 or 58 and thus to carrier selector control circuit CC (FIG. 1A). All other transmitter AND circuits connected to line AL2 are at this time blocked by ground potential in the corresponding group selector line GS. When chain B advances its count so that stage B3 reverses its condition, ground potential again appears on line GS2, as a result of the conducting state of transmitter 3Q1, and blocks transmitter AND circuit &12 from further operation. Similar operation occurs in transmitter AND circuit &13 which is controlled by stages A3 and B2 through resistor R8 and diode D8, respectively. When stage B2 is in its reverse condition so that negative potential appears on line GS2, thus blocking diode D8, a negative pulse appearing in line AL3 passes through resistor R8, function selector switch F13 in either position, and then either diode D25 to line 57 or diode D26 to line 58. It is to be noted that, although FIG. 3 is referenced in keeping with the office circuit shown in FIGS. 1A and 1B, the circuit details can be used to understand and illustrate also the operation at the various field stations which will be shortly described.

As has been previously indicated, in FIGS. 1A and 1B and also FIGS. 2A and 2B, a conventional block diagram illustration of a system of my invention is shown. This specific showing contains, as illustrated by the office of FIGS. 1A and 1B, only four groups of functions with four functions in each group. Thus, four pair of registry AND circuits and also four transmitting AND circuits are shown by conventional blocks for each group. Each of the counting chains is provided with five stages. Although the system shown has a capability of handling only sixteen functions in each direction, that is, sixteen control and sixteen indication functions between the office and the various stations, many more functions can actually be handled by extending the counting chains and thus increasing the size of the groups. A common arrangement frequently used has ten functions for each group with ten groups in the system, a total of 100 functions. Under these conditions, each of the counting chains includes eleven stages. Of course, it is obvious that larger numbers of functions may be transmitted and received by varying the arrangement of my system. As also previously indicated, it is not a requirement of the system that the two counting chains, that is, the A and B chains, have identical numbers of counting stages therein. In fact, any desired arrangement or number of functions may be handled by the proper design of the system and such arrangements are included as part of my invention. The specific showing of 16 functions, that is, four groups of four functions each, is for purposes of simplified illustration which may be more easily understood.

In FIG. 1B, a bank of function control or selector switches is illustrated, each designated by the general reference character F with a numerical suffix corresponding to that of the associated transmitter AND circuit. Any type of switch may be used for this purpose. Each is here shown as a two-position, manually operable lever provided with two armatures or movable portions which operate at the same time when the switch handle is moved. One switch corresponds to each function to be transmitted from the office location and thus one switch is associated with each transmitter AND circuit. The right hand armature of each switch receives the output of the corresponding AND circuit and passes it to the carrier selector control circuit CC through lines 57 and 58 depending as to whether the switch lever is in its left or right hand position, respectively. This matter has been previously discussed in more detail in connection with the description of the detailed circuit of FIG. 3.

The left armatures are connected in series circuit, each contact being so connected as to briefly interrupt the circuit through the series connection when a switch is moved to its opposite position. The circuit extends through each group of switches connected in series from the negative potential bus LN to a change detector circuit E associated with that group. Thus, for the first group of switches at the left of FIG. 1B, a circuit extends from bus LN through the left armatures and contacts of switches F4, F3, F2, and F1 connected in series to detector circuit E1. Similar circuits may be traced for the other groups of switches. Each of the detector circuits shown is provided with a second input which is transmitted from the correspondingly numbered stage of the B chain over the leads 51 to 54, inclusive. Each of the detector circuits E supplies, at various times, two outputs, each of which is connected in multiple with the similar outputs of the other detector circuits and thence to lines 55 and 56. The output over the former connection is supplied to group circuit G to be discussed later, while the output from the second circuit is supplied to the emitter of a separate transistor Q15, the purpose of which will appear in the discussion shortly, and to a group stepping carrier transmitter and receiver combination TA and RA.

For a detailed circuit arrangement for the change detector circuit E, reference is now made to FIG. 4. It is to be seen that the detector circuit, specifically shown as E2, comprises a bi-stable circuit arrangement having the usual Eccles-Jordan circuit connections. Circuit E2 includes transistors Q13 and Q14 which have the conventional connections to buses LN, LE, and LB and intra-circuit connections to provide bi-stable operation. As specifically shown, the normal condition of this circuit is with transistor Q13 conducting and the reverse condition is with transistor Q14 conducting. As always in such circuit connections, when one transistor is in its conducting state, the other of necessity is in its non-conducting state. Each of the E circuits detects and stores a function change in the associated group by reversing its condition. For example, circuit E2 of FIG. 4 reverses its condition when any one of the function control switches F11 to F14 of the associated group is moved to its opposite position. If, specifically, function switch F12 is moved from its right hand to its left hand position, it interrupts the circuit extending from bus LN through the function switches connected in series and the pulse generator comprising principally capacitor C5 and diode D15 to the base of transistor Q14. When the circuit is reclosed after interruption by the completion of the movement of switch F12 to its left hand position, a negative potential pulse is developed by capacitor C5 which is applied to the base of transistor Q14. This causes this transistor to become conducting, thus reversing the condition of the bi-stable circuit E2. Circuit E2 is returned to its normal condition when stage B2 of chain B reverses its condition so that a negative potential pulse is developed by capacitor C4 (FIG. 3) and applied through diode D14 and line 52 to the base of transistor Q13. It is thus to be seen that a chain detector circuit reverses its condition when one of the associated function control switches is moved to its opposite position and that the circuit restores to its normal condition when the corresponding stage of the group selector counting chain reverses its condition during the counting action.

When detector circuit E2 reverses its condition, the ground potential then existing at the collector of transistor Q14 is applied through diode D17 to line 56 and, thus, to the emitter of transistor Q15. The negative potential existing at the collector of transistor Q14 is normally blocked by diode D17. When circuit E2 is restored to its normal condition, a negative potential pulse is developed by capacitor C6 and applied through diode D16 to line 55 and, thence, to transistor Q12 in circuit G, to be discussed shortly. It is to be noted that the pulse generator comprising principally capacitor C6 and diode D16 has the usual connection through a resistor to ground potential bus LE. The utility of the ground potential applied to line 56 and the negative potential pulse applied to line 55 will appear shortly in the discussion.

Stepping pulses for the counting chains are generated by a master stepping pulse generator C shown in the upper left of FIG. 1A. This generator supplies negative potential stepping pulses alternately to the stepping lines extending to each of the counting chains, that is, alternately to lines SL1A and SL2A and to lines SL1B and SL2B. This arrangement is shown in more detail in FIG. 4. It is to be noted that two stepping pulse lines for each chain are used to eliminate the possibility of any double stepping action by the chain which might occur if a single stepping line only is used. A pulse distributor circuit D shown in the upper left of FIG. 4 provides a shunt for one or the other pair of stepping lines, that is, the pair SL1A/2A and the pair SL1B/2B, so that stepping pulses are supplied to only one chain at a time. Circuit D comprises the usual bi-stable circuit, connected in the Eccles-Jordan type arrangement, and includes transistors Q7 and Q8. The usual connections, including resistors, to buses LN, LE, and LB are provided. The base of transistor Q7 is connected in addition through resistor R17 and line 61 to the collector of transistor 5Q4 located in counting stage A5 of the A chain. When stage A5 reverses its condition, the collector of 5Q4 assumes the negative potential which is then applied to line 61. However, this negative potential exists only for a relatively short period because of the reset action of the chain which occurs immediately thereafter. Thus, when stage A5 reverses its condition, the negative potential is applied to the base of transistor Q7 and causes this transistor to become conducting and, by necessity, transistor Q8 to become non-conducting. The collector of Q7 thus assumes the ground potential of bus LE. This biases diodes D18 and D19 to shunt the negative stepping pulses being supplied to lines SL1A and SL2A. The resistor arrangements in these stepping lines prevent the shunt from being applied to the other pair of stepping lines. Under this condition of circuit D, the collector of transistor Q8 has substantially the negative potential of bus LN. The application of this potential to diodes D20 and D21, positioned as shown, blocks these rectifiers so that the stepping pulses applied from generator C to the pair of lines SL1B/2B are transmitted and applied to the stages of chain B.

At another time, a negative potential is applied through diode D22 to the base of transistor Q8 from the monostable circuit M, which will be discussed shortly. This causes transistor Q8 to assume its conducting state and, of necessity, transistor Q7 its non-conducting state. Since the collector of transistor Q8 is now at ground potential, diodes D20 and D21 are properly biased to shunt the negative stepping pulses from lines SL1B and SL2B. At the same time, with the collector of transistor Q7 at the negative potential of bus LN, diodes D18 and D19 are biased to the blocked condition so that the stepping pulses in the other pair of lines leading to counting chain A are unaffected. Thus, circuit D, in accordance with its existing condition, determines which counting chain is supplied with stepping pulses from generator C to advance the counting action.

As shown in FIG. 1A, generator C also controls a carrier transmitter TU. This control is such that stepping pulses are transmitted by carrier current over the communication channel between the office and the various stations. This channel is shown as comprising a pair of line wires L1 and L2, although other types of channels may be used. These pulses of carrier current representing the master stepping pulses are received at the stations by a carrier receiver RU, shown in the upper left of FIG. 2A, which supplies equivalent output pulses to a station stepping generator FC. Generator FC, which responds to the carrier current pulses as received by receiver RU, provides stepping pulses at the same rate over the two pairs of stepping lines at the station. The distributor circuit FD at the station shown in FIG. 2A is identical in construction and circuit detail with circuit D already described at the office. It assures that the stepping pulses are applied to only one pair of the stepping lines at any one time so that only one chain stepping action is actuated to agree with the operation at the office. It is believed that this brief description of the generation of the stepping pulses and their application at the stations is sufficient, when taken in connection with the previous description of the circuits at the office location, to provide an understanding of system operation.

The monostable circuit M helps in the control of distributor circuit D. Circuit M includes transistors Q9 and Q10, the normal condition of this circuit being with transistor Q9 in its conducting state. This condition is effected by the negative bias applied to the base of this transistor over the connection to negative potential bus LN through resistor R12. The base of transistor Q10 is connected through a biasing resistor to positive potential bus LB and is also connected through resistor R21 and line 59 to the pulse generator networks which are otherwise connected over lines LM to the collectors of transistors Q2 in the various stages of counting chain B. For example, line LM2, connected to the collector of transistor 2Q2 in stage B2, as shown in FIG. 3, is connected through a pulse generating network, comprising principally capacitor C7 and diode D23, to line 59. A similar pulse generating network comprising capacitor C8 and diode D28 is connected between line LM1 from stage B1 and line 59. When stage B2 reverses its condition, a negative potential pulse is developed in capacitor C7 and feeds through diode D23 and line 59 to the base of transistor Q10 which thus changes to its conducting state. When transistor Q10 becomes conducting, the bias applied to the base of transistor Q9 is changed in the positive direction so that this transistor changes to its non-conducting state. As the pulse developed in capacitor C7 as a result of the reverse of stage B2 decays, monostable circuit M restores to its normal condition through the action of capacitor C9 and resistors R12 and R13. At the end of a delay period, which is determined by the C9, R12 network, the negative bias on transistor Q9 is again restored so that it becomes conducting and thus resets circuit M to its normal condition. In a specific example, this delay period may be approximately one-quarter of a stepping period after the reversal of stage B2. During the period that transistor Q9 is non-conducting, the negative potential existing at its collector is applied through resistor R16 and diode D22 to the base of transistor Q8 in circuit D, causing this transistor to become conducting to again restore the shunt on the stepping line to counting chain B, as was previously explained. It is to be remembered that transistor Q8 remains in its conducting condition until the complete cycle of operation through the A counting chain has again completed.

The group circuit G is used to control and to halt the continuous stepping action through counting chain B when priority calls are registered in the detector circuits. As shown in FIG. 4, circuit G is a bi-stable circuit arrangement of the Eccles-Jordan type including transistors Q11 and Q12. Again the usual connections are made to the potential buses LN, LE, and LB. The normal condition of circuit G is with transistor Q11 in its conducting state. This is assured by the connection from line 61 through resistor R19 to the base of transistor Q11. It is to be remembered that line 61 is connected to the collector of the transistor Q4 in the last stage of the A chain. This transistor Q4, of course, becomes non-conducting when the final count is entered into the A chain. A negative potential, of short duration, thus appears over line 61 at this time and is applied to the base of transistor Q11 to cause this latter transistor to become conducting. A similar short period of negative potential is applied at the end of each counting operation of chain A. The base of transistor Q12 is connected through resistor R20 and line 55 to the pulse generating networks connected to the collector of transistor Q14 in the various detector circuits E. Although the specific showing in FIG. 4 is that of detector circuit E2, with capacitor C6 and diode D16, line 55 is connected in multiple to all of the detector circuits in the manner indicated in FIG. 1B. Specifically, in the example shown, when circuit E2 is restored to its normal condition by a negative pulse over line 52 from the associated stage of counting chain B, a negative pulse is generated by capacitor C6 and applied through diode D16 to line 55 and thus to the base of transistor Q12, which then becomes conducting and, of necessity, transistor Q11 becomes non-conducting. As previously discussed, circuit G will be restored to its other or normal condition at the end of the next counting action in chain A. When, as a result of the movement of one of the function switches F11 to F14, circuit E2 stores a priority call and transistor Q14 becomes conducting, the more positive pulse, developed when the collector of this transistor assumes the ground potential, is blocked by diode D16. However, this ground potential is applied through diode D17 to line 56, as was previously discussed.

The condition of circuit G controls the conducting state of separate transistor Q15 shown in FIG. 4 (also in FIGS. 1A, 2A). A branch path from the input circuit, including resistor R16 and diode D22, between circuit M and circuit D is carried over the collector-emitter path of transistor Q15 and line 56 to a multiple connection to all of the detector circuits as shown in FIG. 1B. This branch path includes diode D24 for purposes which will appear shortly. Using circuit E2, as a specific example, when a priority call is stored and the condition of circuit E2 is reversed, the ground potential then existing at the collector of transistor Q14 may be used to shunt any negative potential being applied to transistor Q8 of circuit D from the collector of transistor Q9 of circuit M. This circuit extends from the collector of transistor Q14 through diode D17, line 56, the emitter-collector circuit of transistor Q15, and diode D24 to a connection with the path between circuits M and D, at the common terminal between resistor R16 and diode D22. It is obvious, of course, that this shunt path is complete and effective only when transistor Q15 is in its conducting condition.

The base of transistor Q15 is connected to the intermediate junction point of the series resistor circuits R14 and R15. These resistors in series are connected between bus LB and the collector of transistor Q12 of circuit G. When transistor Q12 is in its conducting condition, so that its collector is at the ground potential of bus LE, the bias transmitted to the base of transistor Q15 is sufficiently positive to hold this transistor in its non-conducting state. However, when transistor Q12 is in its non-conducting state, which is the normal condition of circuit G, its collector is at the negative potential at bus LN so that the potential of the intermediate junction terminal between series resistors R14 and R15 shifts in the negative direction sufficiently to bias transistor Q15 to its conducting state. The utility of this action will become more apparent during the operational description of the arrangement of my invention. Further explanation will also be given of the branch connections shown in FIG. 4 from the various points in circuit G and the emitter of transistor Q15.

Referring now to FIGS. 1A and 2A, the remaining apparatus comprising the system of my invention, not previously discussed, consists, with the exception of the carrier selector control circuits CC and FCC, of various carrier transmitters and receivers of conventional design. These carrier transmitters and receivers are shown by conventional block diagram as any well known type of such apparatus may be used and the use of such is conventional and well known. It is assumed that, in general, the carrier transmitters supply carrier current to the communication channel, shown as comprising line wires L1, L2, only when a potential input is actually supplied thereto. The carrier receivers are likewise assumed to provide an output in a form of a negative potential signal when the corresponding carrier signal is being received over the communication channel. Two carrier circuits are paired in each direction for the transmission of the functions assigned to this system, that is, the control and indication functions. At the office, the carrier transmitters for the control functions are designated by the reference characters TW and TX, with the corresponding receivers at the station in FIG. 2A designated by the reference characters RW and RX. In general, although it does not involve specifically the circuits of my invention, only one of these two carrier currents is transmitted at a time for the purpose of control function transmission. The corresponding circuits for the transmission of indication functions from the station to the office comprise the carrier transmitters TY and TZ at the station and the corresponding receivers RY and RZ at the office location.

The carrier current circuit for the transmission of stepping pulses from the office to the various stations comprising the transmitter TU at the office and the receiver RU at the various stations has already been previously mentioned. In addition, two circuits for transmission in either direction are provided for group stepping transmission controls. These comprise the transmitters TA and TB at the office, the transmitters FTA and FTB at the stations, the receivers RA and RB at the office, and the receivers FRA and FRB at the stations. The same frequency is transmitted in each direction in these circuits, although different frequencies are used for each of the circuits A and B. At each location, the associated transmitter and receiver TA and RA (FTA, FRA) are interlocked so that only one may be active at a given instant. Although not pertinent herein, this interlock may be so designed as to provide priority for one direction or the other of transmission. All the transmitters and receivers are connected across the line circuits L1 and L2 which is used to illustrate the communication channel extending from the office to the various field stations. It is assumed that the proper filters are incorporated within the conventional blocks used to designate the transmitters and receivers. It is to be understood, of course, that other forms of communication channels different from the direct wire circuit may be used as appropriate and desired.

The carrier selector control circuits CC and FCC at the office and stations, respectively, are used to actuate the proper function transmitter at the corresponding location in accordance with the input circuit over which energy is applied to the selector circuit. Referring to the office location shown in FIGS. 1A and 1B, it is apparent that, as the scanning cycle proceeds through the various groups of transmitter AND circuits, energy is supplied to line 57 or 58 in accordance with the position of the various control function switches F. The actual circuit arrangement of the unit CC may be as shown in my prior application for Letters Patent of the United States, Serial No. 800,775, filed March 20, 1959, for Remote Control Systems, now Patent No. 3,021,248, issued February 13, 1962. Particular reference is made to FIG. 3 of this patent for a showing of circuits which may be used for control circuits CC and FCC. However, it is to be understood that other arrangements may be used as desired. It is also possible to eliminate these selector control circuits, but preferably the function carrier transmitters are isolated from the rest of the system.

Referring specifically to FIGS. 2A and 2B, the apparatus at one of the stations of the system of the present application is shown conventionally. References similar to those used for the office apparatus are used in this conventional block diagram, with the prefix F being added to the reference characters to distinguish in the case of identical station apparatus. Only two groups of function registry and transmitting AND circuits are shown in the matrices at this station. This arrangement is used to indicate that the preceding and subsequent groups will be located at other stations which are included in the installation. Of course, the system of my invention may be applied to a single station system in which case all of the functions corresponding to the functions at the office would be represented at the single station. The function control switches at the station (FIG. 2B) are shown as relay contacts, which is the usual arrangement in such systems, these relays repeating the condition or position of the apparatus which is being controlled from the office location. It has been previously mentioned that the master stepping control for the counting chains of the systems is provided at only one location, herein the office, and carrier pulses are transmitted over the communication channel to each of the stations where the station stepping generator is driven in synchronism. In this manner, the counting chain stepping is synchronized throughout the whole system. This matter will be more fully discussed shortly, particularly as to the synchronism of other stepping action, such as the continuous stepping through the group selector chain, which is obtained through the group selection carrier circuits A and B.

I shall now describe the operation of the system, including my invention, this description being based on the preceding discussion of the various circuit elements shown in the drawings. It is initially assumed that no function changes are stored in any of the detector circuits at the office or at the station and that all of the counting chains have just reset at the end of a scanning cycle. As a result of the last action of counting chain A, circuit D is in the condition with transistor Q7 in a conducting state. Thus, the next stepping pulse is supplied over stepping line SL1B to the group selection counting chain. This causes a reversal of the condition of stage B1, as indicated in FIG. 1A. Through the carrier circuit, including transmitter TU at the office and receivers RU at the stations (shown in FIG. 2A), a similar stepping action occurs at all of the stations so that, at each location, including the office, stage B1 of the group chain is in its reverse condition at the end of this stepping pulse. However, it is believed that a discussion of the operation at the station can be eliminated from the following description for the present without affecting the understanding of the system operation. This is true since the action at all locations is quite similar, particularly when no function change has been stored to create a priority call.

As a result of the reversal of the condition of stage B1, a negative potential pulse is created by the pulse generator comprising capacitor C8 and diode D28 (FIG. 4) as a result of the negative potential on line LM1. Application of this pulse to transmitter Q10 of circuit M reverses the condition of this circuit so that transistor Q9 becomes non-conducting and its collector assumes the negative potential of bus LN. This period of negative potential applied through diode D22 to the base of transistor Q8 causes this transistor to become conducting, shifting the condition of circuit D to that in which stepping pulses are applied over stepping lines SL1A and SL2A. Thus, the next stepping pulse is applied to cause a change in the condition of scanning chain stage A1. It is to be noted that, shortly after this, circuit M returns by its monostable action to its normal condition. However, circuit D remains with transistor Q8 conducting.

The counting action continues to advance through chain A as stepping pulses are alternately supplied to the two associated stepping lines. When the counting action reaches stage A5, a negative potential is supplied over line 61 to the base of transistor Q7 in circuit D causing this circuit to again reverse its existing condition. This negative potential is also applied by a branch of line 61 to the base of transistor Q11 in circuit G so that this transitsor becomes conducting, placing circuit G in its normal condition if it is not already occupying that condition, as is likely. With transistor Q7 in a conducting state, a shunt is applied to the stepping lines of chain A so that the next stepping pulse, with transistor Q8 in its non-conducting state, will be applied to the B chain.

With the completion of the counting action in chain A, however, it is necessary to reset the stages of this chain to their normal condition in preparation for a subsequent counting action. Over another branch of line 61, the negative potential is also applied to the reset control circuit for chain A shown in FIG. 1A by a conventional block designated AR. This reset circuit is in the form of an AND circuit, much the same as the AND circuits used in the registry matrix. A second input to this circuit is provided, as shown in FIG. 4, over line 62 from the collector of transistor Q8 of circuit D, line 62 being connected to the point in circuit D that assumes the same potential as line 61 when the next stepping pulse is to be routed to the pair of stepping lines SL1B/2B. It is sufficient to understand that, with this potential condition existing on both lines 61 and 62, an output is applied by circuit AR, over reset line RL1A (FIG. 1A), to the first stage of counting chain A in the manner to cause the transistor Q4 of that stage to become conducting. This reset action is followed by a cascaded resetting of the chain through the interstage connections such as RL2A and RL3A shown in FIG. 3. This action, of course, can only occur when the proper conditions of lines 61 and 62 occur simultaneously to initiate the action. An output from circuit G may also be used to prove that this circuit has assumed the state to render transistor Q15 conducting, if it is desired to have this additoinal proof prior to the reset of chain A. However, such connections are not shown in the present system. A similar resetting action occurs at the station locations through the input to reset circuit FAR from lines F61 and F62, the initial reset pulse to stage FA1 being applied over line FRL1A.

A similar reset control circuit is provided for the group selection counting chain B. In FIG. 1A, this control circuit is shown by a conventional block diagram designated BR. A similar control circuit at the station is designated by reference character FBR. Each of these control circuits is supplied with an input from the last stage in the associated counting chain B. An additional check is made over the communication channel that other chains B have reached the same state in the counting action. When this input, not shown in the present system as it does not pertain to the present invention, is also applied to circuit BR, a reset pulse is provided, at the office over line RL1B and at the various stations over line FRL1B, to the first stage of the corresponding chain to reset that stage. Cascaded resetting action then advances through the chain in accordance with the interstage connections such as RL2B and RL3B, shown in FIG. 3.

During the scan of the initial group of registry and transmission AND circuits in the matrices, it is assumed that all of the function control switches F1 to F4 remain in their right hand position. Thus, the negative potential is applied over line 58 to control circuit CC which, under this condition, selects control carrier transmitter TX for the transmission of carrier pulses to the station. During the same scanning action, as appropriate, a negative signal appears over lines LY and LZ in accordance with the carrier receiver which is actuated by carrier current from the station. As the various registry AND circuits are made active during the scanning action, the indication function is registered in the office in accordance with the signal received. Similar action occurs at the station at which these functions are assigned, in the present case, a station preceding that shown in FIGS. 2A and 2B. However, the apparatus would be similar and the action is obvious from the preceding discussion when taken in connection with the accompanying drawings, it being remembered that the control function carrier current from the office actuates receiver RX at the corresponding station and is registered by the X AND circuits at that station.

The scanning action of the various groups in the registry and transmission matrices continues. I shall now assume that, during the scan of the third group, while stage B3 of the group counting chain is reversed, function control lever F13 at the office moved to its left hand position to effect the transmission of a change in that function to the station shown in FIGS. 2A and 2B. With reference to FIG. 4, this movement of switch F13 to its other position creates a negative potential pulse from capacitor C5 which is applied to the base of transistor Q14 of circuit E2 to reverse the condition existing in this detector circuit. This reversal action in circuit E2 stores a priority call for that group by the detection of the change in an assigned function. With transistor Q14 in its conducting state, ground potential exists on line 56, as previously described. It is to be noted that, prior to this reversal of the condition of circuit E2, transistor Q13 assuredly was in its conducting state as a negative pulse was developed by capacitor C4, shown in FIG. 3, and transmitted through diode D14 and line 52 to circuit E2 at the time that stage B2 was reversed in the counting action.

The ground potential on line 56 is applied to transmitter TA to activate this transmitter to send a carrier current to the stations. The interlock arrangement between transmitters TA and RA at the office now prevents receiver RA from being activated by any current from the station or from its local associated transmitter. Reception of this carrier current at the station shown in FIG. 2A by receiver FRA creates a ground potential at that location on line F56. At both locations then, referring to FIG. 4, ground potential is applied to the emitter of transistor Q15. This transistor at the present time is in its conducting condition under the influence of the negative bias developed at the junction of resistors R14, R15 because transistor Q12 of circuit G is non-conducting. It may be noted that, at this instant, line 55 has no potential, the ground potential at the collector of transistor Q14 being blocked by diode D16. The ground potential from line 56 is applied through the emitter-collector circuit of transistor Q15 and diode D24 to shunt any negative potential developed at the collector of transistor Q9 of monostable circuit M. This prevents circuit M from restoring distributor circuit D to its normal condition. In other words, after the condition of circuit D is next shifted, upon the completion of the counting action in chain A, transistor Q8 remains non-conducting and transistor Q7 conducting so that the stepping pulses continue to be shunted away from the A chain and applied only to the B chain. In each location, group selector chain B continues its stepping action to advance on subsequent pulses to successive stages of the chain. Thus, the next stepping pulse received from generator C at the office following the reversal of stage B4 is also applied to the B chain and the reversal of stage 4 is immediately followed, on the subsequent step, by the reversal of stage B5. This latter action, of course, causes a reset of the counting chain to enable a new counting action to be initiated.

Group chain B continues to step to stages B1 and B2 without interruption. When stage B2 reverses, a negative potential pulse is generated in capacitor C4 (FIG. 3) over line 52 and passed to the base of transistor Q13 of circuit E2 (FIG. 4). Circuit E2 thus shifts to its normal condition, transistor Q14 becoming non-conducting. This action is possible since the negative potential pulse on the base of transistor Q14 has long since decayed as capacitor C5 became fully charged. A negative potential pulse is now generated by capacitor C6 and transmitted through diode D16 and line 55 to the base of transistor Q12 in circuit G, and transistor Q12 becomes conducting. The bias on the base of transistor Q15 is shifted to a more positive potential and this transistor assumes its non-conducting state. This interrupts the shunt circuit from line 56 through diode D24. However, the supply of ground potential from the collector of transistor Q14 is also interrupted at the office location. The negative potential from the base of transistor Q9 thus is no longer shunted away from application to transistor Q8 in circuit D. Also, transmitter TA is no longer actuated.

When transistor Q12 at the office becomes conducting, the application of the ground potential from its collector to the other office group stepping transmitter TB causes the transmission of carrier current of frequency B to the station to be received by receiver FRB. Receiver FRB applies a negative potential to the base of the corresponding transistor Q12 over the branch of line 55 indicated in FIG. 4. Transistor Q12 at the station shifts to its conducting state, causing transistor FQ15 to become non-conducting. At the station location, considering the circuit shown in FIG. 4 as applying, the non-conducting state of transistor Q15 interrupts the circuit from receiver RA through diode D24 and the control of circuit D by circuit M at the station shown in FIG. 2A is reestablished.

At each location, when stage B2 of the counting chain B reverses its condition, circuit M is also reversed, as previously described, by the negative potential pulse over line 59 applied to the base of transistor Q10. The negative potential appearing on the collector of transistor Q9, which is then non-conducting, is now applied through diode D22 to the base of transistor Q8 of circuit D. Transistor Q8 thus becomes conducting, shunting the stepping pulses appearing on the lines SL1B and SL2B. Meanwhile, transistor Q7 becomes non-conducting, blocking diodes D18 and D19 so that the stepping pulses are again applied to counting chain A in the usual manner. The stepping action of the A chain thus begins at the next stepping pulse so that scanning of the AND circuits of group 2 is initiated, that is, the circuits 11 to 14, respectively, both at the office and the station. It is to be noted that similar action in connection with circuits M and D occurs at the station at the same time as at the office so that the stepping of chain A at the station is synchronized with that of the office.

If a contact such as I22 at the station, as shown in FIG. 2B, releases while stages B4, B5, and B1 are being scanned successively in order to answer the priority call stored by group 2 at the office, another priority call is registered, in the same manner previously described, by the reversal of the condition of circuit FE3 at the station. When stage B2 is reached and circuit E2 at the office is restored, the transmission from group transmitter TA at the office is halted by the removal of the group potential from line 56. However, with circuit FE3 at the station reversed, transmitter FTA is immediately actuated to transmit the same frequency, from the station of FIG. 2A, to signify that a priority call is stored at this location for transmission as soon as possible. However, at the office, transistor Q15 is in its non-conducting state since circuit G has been reversed by the restoration of circuit E2. The signal from receiver RA at the office, as a result of the reception of carrier current of frequency A from the station, is thus blocked by the non-conducting state of transistor Q15 from shunting the negative potential signal from circuit M which restores circuit D as described above. At the station, transistor Q12 is held conducting, and transistor FQ15 non-conducting to interrupt the shunt circuit, by the signal from receiver FRB resulting from the transmission by transmitter TB, which is held active by transistor Q12 until chain A completes its cycle. Thus, the action recently described occurs to actuate the scan of the functions of group 2 to transmit the function change stored by the movement of switch F13. Immediately after group 2 is scanned, the stepping of the B chain at all locations is immediately resumed so that priority calls stored at the station may be answered and the indication function change immediately transmitted. It is to be noted that although the example here has stored the indication function in the next group, similar action will occur regardless of in which later group the indication function change occurs.

It is apparent that the system of my invention applied to a continuously scanning remote control system enables a change in any function to be shortly transmitted without regard to the number of steps which normally would intervene between the existing position in the scanning cycle and the position occupied by the changed function. In other words, the system of my invention provides for bypassing a large portion of the intervening scanning action to quickly reach the portion of the scanning cycle to which the changed function is assigned so that it may be shortly transmitted to the other location of the system. This reduces the time delay prior to transmission of controls and the reception of indications from the stations so that relatively large numbers of functions may be assigned to a single system without undue delay in the control of procedures exercised by the system operator. This action is accomplished in relatively a simple manner requiring a minimum amount of additional apparatus.

Although I have herein shown and described but one form of remote control system embodying the circuits of my invention, it is to be understood that various changes and modifications within the scope of the appended claims may be made without departing from the spirit and scope of my invention.

Having thus described my invention, what I claim is:

1. In a continuously scanning remote control system including a control office and at least one station location connected by a communication channel over which a plurality of functions are transmitted in each direction, the combination comprising, a counting means at each location for successively scanning the functions at that location in predetermined cycles, a stepping control means having control connections for driving said counting means at all locations in synchronism, transmitter-receiver means at each location controlled by said counting means and having connections for normally transmitting and receiving successively said functions over said channel in each direction during each scanning cycle, a detector means at each location controlled by the correspondingly located functions for registering a change in any of the corresponding functions, each said detector means controlling said counting means at all locations for bypassing selected portions of the scanning cycle to immediately scan a predetermined portion of the cycle when that detector means registers a change in a function scanned during that predetermined portion, and other transmitter-receiver means controlled by said detector means and having connections to said channel for synchronizing the bypassing of said selected portions of said scanning cycle at all locations.

2. In a continuously scanning remote control system including a control office and at least one station location connected by a communication channel over which a plurality of functions are transmitted in each direction, the combination comprising, a counting means at each location for successively scanning the functions at that location in predetermined cycles, a stepping control means having control connections for driving said counting means at all locations in synchronism, transmitter-receiver means at each location controlled by said counting means and having connections for normally transmitting and receiving successively said functions over said channel in each direction during each scanning cycle, a detector means at each location controlled by the correspondingly located functions for registering a change in any of the corresponding functions, another control means at each location at times responsive to the scanning operation of said counting means and controlled by the associated detector means and having connections for effecting the bypassing of selected portions of said scanning cycle and the immediate scanning of a predetermined portion of the cycle when said detector means registers a change in a function scanned during that predetermined portion, and other transmitter-receiver means controlled jointly by said detector means and by said other control means and having connections to said channel for synchronizing the bypassing of said selected portions of said scanning cycle at all locations.

3. At a transmitting location in a continuously scanning remote control system having a plurality of assigned function selectors divided into groups for transmission, the combination comprising, a first counting chain having a plurality of stages for scanning the individual function selectors within each group, a second counting chain having a plurality of stages for scanning the function selector groups, a source of stepping pulses having connections for at times driving each chain through its scanning cycle, a first control means having connections for distributing the stepping pulses to said chains in a manner to normally interpose a scan cycle of said first chain between the stepping of each pair of adjacent stages in said second chain, detection means controlled by said function selectors for storing a group indication of a change in any function selector, other control means controlled by said detection means for controlling said first control means to eliminate the scan cycle of said first chain between the stepping of each pair of adjacent stages of said second chain when a function selector change is stored, said second chain controlling said other control means for restoring the scanning of said first chain when the second chain continuous scanning reaches the stage corresponding to the group within which the stored function selector change occurred.

4. At a location in a remote control system, the combination comprising, a first and a second counting chain, each having a plurality of stages and capable of successively stepping from stage to stage when supplied with a sequential series of stepping pulses, a source of sequential stepping pulses, a distributor means having connections to said source and controlled by said counting chains for normally distributing the stepping pulses from said source to said chains in a manner to interpose a complete stepping cycle of said first chain between the sequential stepping to the subsequent stage of each adjacent pair of stages of said second chain, a call detector for each stage of said second chain for registering a priority call, a control means controlled by said call detectors for controlling said distributor means to distribute said stepping pulses only to said second chain to successively advance the chain stepping action through the successive stages when a priority call is registered in any detector, said control means being also controlled by said second chain for interrupting the successive stepping of said second chain when the stage is reached corresponding to the detector registering the priority call.

5. At a location in a continuously scanning remote control system, the combination comprising, a first and a second counting chain, each having a plurality of successive stages and capable of successively stepping from stage to stage when a series of sequential stepping pulses are supplied thereto, a stepping pulse source having separate connections to each of said chains for supplying pulses thereto, a distributor circuit connected for shunting one or the other of said separate connections to effect stepping in only one of said chains at a time, said distributor being controlled by said first chain for shifting the pulse shunt to the separate connections of said first chain at the end of each complete first chain stepping action, said distributor being normally controlled by said second chain for shifting the pulse shunt to the separate connections of said second chain at the end of the stepping action into each second chain stage, a detector circuit corresponding to each stage of said second stage for registering a priority call, a control means controlled by the detector circuits for interrupting the normal control of said distributor circuit by said second chain to hold the pulse shunt on the first chain separate connections when a priority call is registered in any detector circuit, said second chain having connections to all of said detector circuits for restoring the control of said second chain upon said distributor circuit when the stepping action in said second chain reaches the stage corresponding to the detector circuit in which the priority call is registered.

6. At a location in a continuously scanning remote control system, the combination comprising, a first and a second counting chain, each having a plurality of successive stages and capable of successively stepping from stage to stage when a series of sequential stepping pulses are supplied thereto, a stepping pulse source having separate connections to each of said chains for supplying pulses thereto, a distributor circuit connected for shunting one or the other of said separate connections to effect stepping in only one of said chains at a time, said distributor being controlled by the said first chain for shifting the pulse shunt to the separate connections of said first chain at the end of each complete first chain stepping action, said distributor being normally controlled by said second chain for shifting the pulse shunt to the separate connections of said second chain at the end of the stepping action into each second chain stage, a detector means for registering a priority call for a particular stage of said second chain, a control means controlled by said detector means for interrupting the normal control of said distributor circuit by said second chain when a priority call is registered to hold the pulse shunt on the first chain separate connections, thus effecting successive stepping of said second chain, said second chain having connections to said detector means for restoring the control of said distributor circuit by said second chain when the second chain stepping action reaches said particular stage for which the priority call is registered.

7. At a location in a continuously scanning remote control system, the combination comprising, a first and a second counting chain, each having a plurality of successive stages and capable of stepping from stage to stage when sequential stepping pulses are supplied thereto, a pulse source having connections to said chains for supplying successive stepping pulses thereto, a distributor circuit having a first and a second condition, said distributor circuit controlling the connections from said source to said chains for effecting the supply of pulses only to said first chain and only to said second chain as said distributor circuit is in its first and its second condition respectively, a circuit means controlled by said first chain for shifting said distributor circuit to its second condition at the end of each complete first chain stepping action, a first control means controlled by each stage of said second chain and having connections for normally shifting said distributor circuit to its first condition as each such stage completes a stepping action, a detector circuit corresponding to each second chain stage for registering a priority call for that corresponding stage, a circuit element having an open and a closed circuit condition, said first chain having connections assuredly shifting said circuit element to its closed circuit condition at the end of each complete first chain stepping action, a circuit connection to said first control means controlled jointly by all said detector circuits and by said circuit element for interrupting the shift of said distributor circuit from its second to its first condition when a call is registered in any detector circuit and said circuit element is in its closed circuit condition, a connection from each second chain stage to the corresponding detector circuit for cancelling a registered priority call when that stage completes a stepping action, each detector circuit having connections for shifting said circuit element to its open circuit condition when a registered priority call is cancelled.

8. At a location in a continuously scanning remote control system, the combination comprising, a first and a second counting chain, each having a plurality of successive stages and capable of stepping from stage to stage when sequential stepping pulses are supplied thereto, a pulse source having connections to said chains for supplying successive stepping pulses thereto, a distributor circuit having a first and a second condition, said distributor circuit controlling the connections from said source to said chains for effecting the supply of pulses only to said first chain and only to said second chain as said distributor circuit is in its first and its second condition respectively, a circuit means controlled by said first chain for shifting said distributor circuit to its second condition at the end of each complete first chain stepping action, a first control means controlled by each stage of said second chain and having connections for normally shifting said distributor circuit to its first condition as each such stage completes a stepping action, a detector circuit corresponding to each second chain stage for registering a priority call for that corresponding stage, a circuit element having an open and a closed circuit condition, a second control means operable to a first and a second condition and having connections for shifting said circuit element to its closed and its open circuit condition as said second control means occupies its first and second condition, respectively, a circuit connection to said first control means controlled jointly by said detector circuits and by said circuit element for interrupting the shift of said distributor circuit from its second to its first condition when a priority call is registered in any detector circuit and said circuit element is in its closed circuit condition, each second chain stage controlling the corresponding detector circuit for cancelling a priority call registered therein when that stage completes a stepping action, said first chain controlling said second control means for shifting said second control means to its first condition at the end of each complete first chain counting action, each said detector circuit controlling said second control means for shifting that control means to its second condition when a priority call registry is cancelled from that detector circuit.

9. At a location in a continuously scanning remote control system, the combination comprising, a first and a second counting chain, each having a plurality of successive stages and capable of stepping from stage to stage when sequential stepping pulses are supplied thereto, a pulse source having connections to said chains for supplying successive stepping pulses thereto, a distributor circuit having a first and a second condition, said distributor circuit controlling the connections from said source to said chains for effecting the supply of pulses only to said first chain and only to said second chain as said distributor circuit is in its first and its second condition respectively, a circuit means controlled by said first chain for shifting said distributor circuit to its second condition at the end of each complete first chain stepping action, a first control means controlled by each stage of said second chain and having connections for normally shifting said distributor circuit to its first condition as each such stage completes a stepping action, a detector circuit corresponding to each second chain stage for registering a priority call for that corresponding stage, a circuit connection to said first control means controlled by said detector circuits for interrupting the shift of said distributor circuit from its second to its first condition when a priority call is registered in any detector circuit, a second control means operable to a first and a second condition and having connections for interrupting said circuit connection when said second control means occupies its second condition, each second chain stage controlling the corresponding detector circuit for cancelling a priority call registered therein when that stage completes a stepping action, said first chain controlling said second control means for shifting said second control means to its first condition at the end of each complete first chain counting action, each said detector circuit controlling said second control means for shifting that control means to its second condition when a priority call registry is cancelled from that detector circuit.

10. At a location in a continuously scanning remote control system including a plurality of locations connected by a communication channel, the combination comprising, a first and a second counting chain, each having a plurality of successive stages and capable of stepping from stage to stage when sequential stepping pulses are supplied thereto, a pulse source having connections to said chains for supplying successive stepping pulses thereto, a distributor circuit having a first and a second condition, said distributor circuit controlling the connections from said source to said chains for effecting the supply of pulses only to said first chain and only to said second chain as said distributor circuit is in its first and its second condition respectively, a circuit means controlled by said first chain for shifting said distributor circuit to its second condition at the end of each complete first chain stepping action, a first control means controlled by each stage of said second chain and having connections for normally shifting said distributor circuit to its first condition as each such stage completes a stepping action, a detector circuit corresponding to each second stage for registering a priority call for that corresponding stage, a first transmitter controlled by said detector circuits and having connections to said channel for transmitting a priority signal when a priority call is registered in any detector circuit, a first receiver having connections to said channel for receiving a priority signal from another location, a circuit connection to said first control means controlled by all said detector circuits and by said first receiver for interrupting the shift of said distributor circuit from its second to its first condition when a priority call is registered in any detector circuit or when said second receiver is receiving a priority signal, a control connection from each second chain stage to the corresponding detector circuit for cancelling a registered priority call when that stage completes a stepping action, a second control means operable to a first and a second condition and having connections for interrupting said circuit connection when said second control means occupies its second condition, a second transmitter controlled by said second control means and having connections to said channel for transmitting a signal when said second control means occupies its second condition, a second receiver having connections to said channel for receiving a priority cancel signal from said other location, said second control means being controlled by said first chain for shifting to its first condition at the end of each complete first chain counting action, said second control means also being controlled by said detector circuits and by said second receiver for shifting to its second condition when a priority call registry is cancelled or when a priority cancel signal is received.

References Cited in the file of this patent

UNITED STATES PATENTS

| | | |
|---|---|---|
| 2,504,999 | McWhirter et al. | Apr. 25, 1950 |
| 2,565,271 | Sealander | Aug. 21, 1951 |
| 2,574,774 | Baughman | Nov. 13, 1951 |